United States Patent
Sagong et al.

(10) Patent No.: US 11,024,073 B2
(45) Date of Patent: Jun. 1, 2021

(54) METHOD AND APPARATUS FOR GENERATING VIRTUAL OBJECT

(71) Applicant: Samsung Electronics Co., Ltd., Suwon-si (KR)

(72) Inventors: Donghoon Sagong, Suwon-si (KR); Jiyeon Kim, Hwaseong-si (KR); Minjung Son, Suwon-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 15/918,054

(22) Filed: Mar. 12, 2018

(65) Prior Publication Data

US 2019/0122414 A1    Apr. 25, 2019

(30) Foreign Application Priority Data

Oct. 23, 2017    (KR) .......................... 10-2017-0137757

(51) Int. Cl.
| | | |
|---|---|---|
| G06T 15/00 | (2011.01) | |
| G06T 17/20 | (2006.01) | |
| G06T 15/40 | (2011.01) | |
| G06T 15/04 | (2011.01) | |

(52) U.S. Cl.
CPC ............ G06T 15/005 (2013.01); G06T 15/04 (2013.01); G06T 15/40 (2013.01); G06T 17/20 (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 6,690,825 B1* | 2/2004 | Nakayama | G06K 9/2054 348/169 |
| 6,930,834 B2 | 8/2005 | Ogusu et al. | |
| 7,406,220 B1 | 7/2008 | Christensen et al. | |
| 8,179,328 B2 | 5/2012 | Brown | |
| 10,210,669 B1* | 2/2019 | Cox | G06F 17/5009 |
| 2002/0028418 A1* | 3/2002 | Farag | A61C 9/0053 433/29 |
| 2011/0194739 A1* | 8/2011 | Vincent | G06K 9/6209 382/128 |
| 2013/0051516 A1 | 2/2013 | Yang et al. | |

(Continued)

FOREIGN PATENT DOCUMENTS

| | | |
|---|---|---|
| JP | 2016-178283 A | 10/2016 |
| KR | 10-2017-0050465 A | 5/2017 |

OTHER PUBLICATIONS

Fouhey, David F, et al., "3D Shape Attributes", 2016 IEEE Conference on *IEEE Transactions on Pattern Analysis and Machine Intelligence*, vol. PP, Issue: 99, 2017 (pp. 1516-1524).

*Primary Examiner* — Saptarshi Mazumder
(74) *Attorney, Agent, or Firm* — NSIP Law

(57) ABSTRACT

A method and apparatus for generating a virtual object are provided, the method includes acquiring a point cloud of an object to generate a virtual object, determining shape attribute information of the object based on an image of the object, changing a position of at least one point in the point cloud based on the shape attribute information, and generating a virtual object for the object based on a changed point cloud.

14 Claims, 9 Drawing Sheets

(56) References Cited

U.S. PATENT DOCUMENTS

| | | |
|---|---|---|
| 2013/0147785 A1* | 6/2013 | Patiejunas ............... G06T 15/04 |
| | | 345/419 |
| 2013/0163858 A1 | 6/2013 | Kim et al. |
| 2015/0109415 A1 | 4/2015 | Son et al. |
| 2015/0117491 A1 | 4/2015 | Lee et al. |
| 2017/0005416 A1 | 1/2017 | Gendron et al. |
| 2017/0116498 A1* | 4/2017 | Raveane ................... G06N 3/10 |
| 2017/0154471 A1* | 6/2017 | Woo ......................... G06T 7/11 |
| 2017/0164920 A1 | 6/2017 | Lavallee et al. |
| 2018/0025496 A1* | 1/2018 | Lindner ................... G06T 7/50 |
| | | 382/154 |

* cited by examiner

200

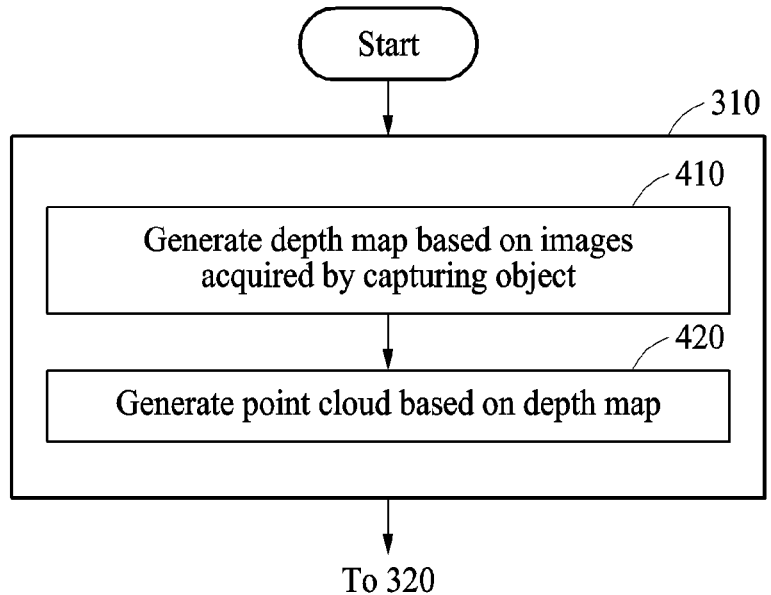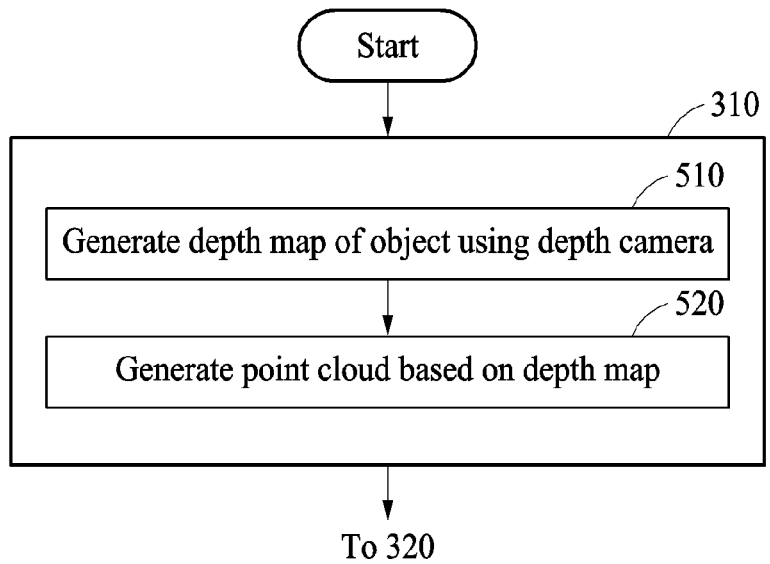

600

| mirror symmetry | rotational symmetry | thin structure | rough surface | · · · | ~610 |
|---|---|---|---|---|---|
| 1 | 0 | 1 | 0 | · · · | ~620 |

METHOD AND APPARATUS FOR GENERATING VIRTUAL OBJECT

CROSS-REFERENCE TO RELATED APPLICATIONS

This application claims the benefit under 35 USC § 119(a) of Korean Patent Application No. 10-2017-0137757, filed on Oct. 23, 2017, in the Korean Intellectual Property Office, the entire disclosure of which is incorporated herein by reference for all purposes.

BACKGROUND

1. Field

The following description relates to method and apparatus for generating a virtual object by changing point cloud based on an image acquired by capturing an object.

2. Description of Related Art

A virtual object representing a shape of a real object may be used in digital content. For example, a virtual object may be used in virtual reality (VR) content or augmented reality (AR) content. Since VR content or AR content needs to implement an environment similar to a reality and needs to interact closely with a user, a virtual object may be useful.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating a virtual object, the method including acquiring a point cloud that is generated based on a depth map of the object, determining shape attribute information of the object based on an image of the object, changing a position of at least one point in the point cloud based on the shape attribute information, and generating a virtual object for the object based on the point cloud in which the position of the at least one point is changed.

The determining of the shape attribute information may include determining the shape attribute information using a neural network that is trained to recognize a shape of the object.

The shape attribute information may be a vector representing a plurality of shapes.

An element of the vector may be a binary value.

The changing of the position of the at least one point in the point cloud may include calculating an energy field of the point cloud based on the shape attribute information, and changing the position of the at least one point in the point cloud based on the energy field.

The calculating of the energy field may include calculating the energy field based on the vector.

The calculating of the energy field based on the vector may include determining a weight of each of elements of the vector, and calculating the energy field based on the weight applied to the each of the elements of the vector.

The changing of the position of the at least one point in the point cloud may include changing a position of a first point in the point cloud, to correspond to a first element of the vector, and changing a position of a second point in the point cloud, to correspond to a second element of the vector.

The acquiring of the point cloud may include generating a depth map based on the image, and generating the point cloud based on the depth map.

The generating of the depth map may include generating depth maps for multiple viewpoints of the object.

The acquiring of the point cloud may include generating the depth map of the object using a depth camera, and generating the point cloud based on the generated depth map.

The generating of the virtual object may include generating a three-dimensional (3D) mesh based on the point cloud in which the position of the at least one point is changed, and generating a texture of the 3D mesh.

The method of claim 1, wherein the virtual object is included in any one or any combination of augmented reality (AR) content or virtual reality (VR) content.

The generating of the texture of the 3D mesh may include generating the texture of the 3D mesh, in response to the image being a color image.

A number of times the position of the at least one point in the point cloud may be changed corresponds to a number of elements of the vector.

In another general aspect, there is provided an apparatus for generating a virtual object, the apparatus including a processor configured to acquire a point cloud that is generated based on a depth map of the object, determine shape attribute information of the object based on an image of the object, change a position of at least one point in the point cloud based on the shape attribute information, and generate a virtual object for the object based on the point cloud in which the position of the at least one point is changed.

The determining of the shape attribute information may include determining the shape attribute information using a neural network that is trained to recognize a shape of the object.

The shape attribute information may be a vector representing a plurality of shapes.

The processor may be configured to calculate an energy field of the point cloud based on the shape attribute information, and change the position of the at least one point in the point cloud based on the energy field.

The processor may be configured to change a position of a first point of the at least one point in the point cloud, to correspond to a first element of the vector, and change a position of a second point of the at least one point in the point cloud, to correspond to a second element of the vector.

The processor may be configured to generate a depth map based on the image, and acquire the point cloud based on the generated depth map.

The apparatus may include a memory configured to store any one or any combination of the depth map of the object, the image of the object, and the virtual object.

Other features and aspects will be apparent from the following detailed description, the drawings, and the claims.

BRIEF DESCRIPTION OF THE DRAWINGS

FIG. 4 is a diagram illustrating an example of acquiring a point cloud.

FIG. 5 is a diagram illustrating another example of acquiring a point cloud.

Figure 1:
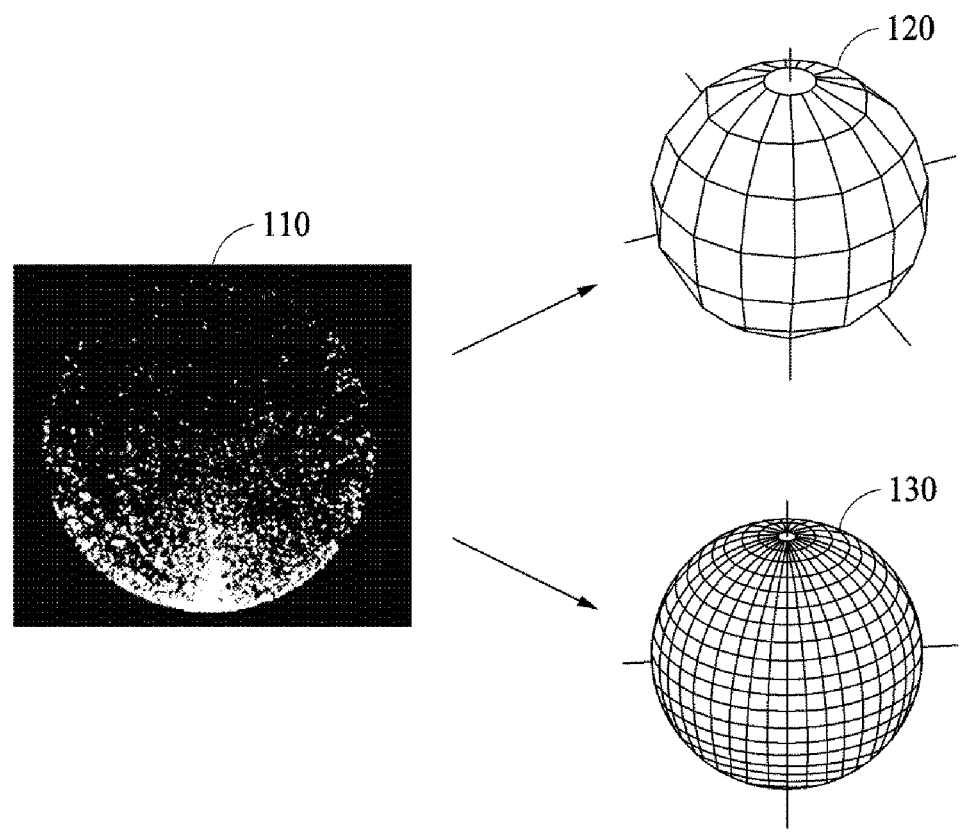
FIG. 1 illustrates an example of a point cloud and virtual objects.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the present disclosure, however, should not be construed as limited to the examples set forth herein. Like reference numerals in the drawings refer to like elements throughout the present disclosure.

Various modifications may be made to the examples. However, it should be understood that these examples are not construed as limited to the illustrated forms and include all changes, equivalents or alternatives within the idea and the technical scope of the present disclosure.

The terminology used herein is for the purpose of describing particular examples only and is not intended to be limiting of the present inventive concept. As used herein, the singular forms "a," "an" and "the" are intended to include the plural forms as well, unless the context clearly indicates otherwise.

Regarding the reference numerals assigned to the elements in the drawings, it should be noted that the same elements will be designated by the same reference numerals, wherever possible, even though they are shown in different drawings. Also, in the description of examples, detailed description of well-known related structures or functions will be omitted when it is deemed that such description could cause ambiguous interpretation of the present disclosure.

FIG. 1 illustrates an example of a point cloud 110 and virtual objects 120 and 130.

As virtual reality (VR) content or augmented reality (AR) content is increasingly created and being used, a virtual object generated based on a real object is being used in the VR content or AR content. When a similarity between the generated virtual object and the real object increases, a user of content gets absorbed in the content. The virtual object represents appearance information of the real object.

A virtual object is generated based on the point cloud 110 of a real object. The point cloud 110 is converted into volume data, to generate a virtual object. To generate a virtual object similar to a real object, it is advantageous to reduce an error occurring in a process of acquiring the point cloud 110 and a process of converting the point cloud 110 into the volume data. The volume data is, for example, a three-dimensional (3D) mesh. For example, when the point cloud 110 does not adequately represent appearance information of a real object, different virtual objects, for example, the virtual objects 120 and 130, are generated.

For example, a method of determining a shape of a real object based on an image acquired by capturing the real object and reflecting the determined shape to the point cloud 110 is used. A virtual object generated based on the point cloud in which the determined shape is reflected represents an appearance of the real object. Examples of generating a virtual object will be further described below with reference to FIGS. 2 through 10.

Figure 2:
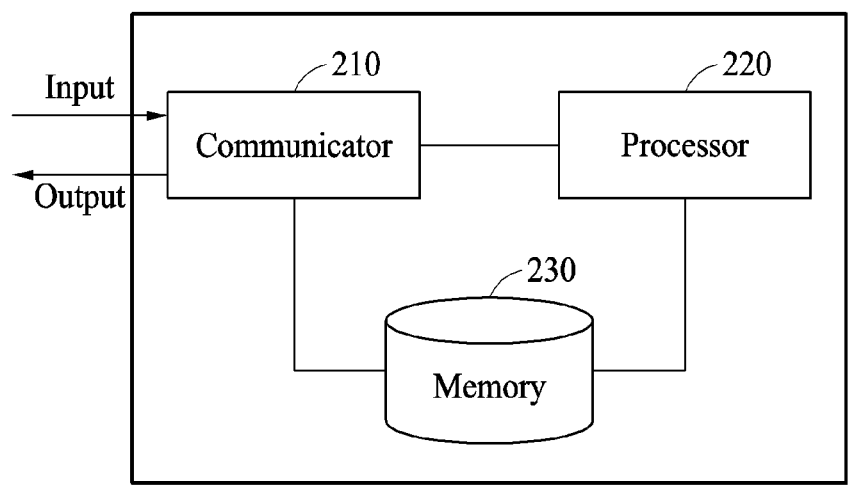
FIG. 2 is a diagram illustrating an example of a configuration of a virtual object generation apparatus.

FIG. 2 is a diagram illustrating an example of a configuration of a virtual object generation apparatus 200.

Referring to FIG. 2, the virtual object generation apparatus 200 includes a communicator 210, a processor 220 and a memory 230.

The communicator 210 is connected to the processor 220 and the memory 230 and transmits and receives data. In an example, the communicator 210 is connected to an external device and transmits and receives data. In the following description, an expression "transmitting and receiving "A"" refers to transmitting and receiving data or information representing "A".

The communicator 210 is implemented as, for example, a circuitry in the virtual object generation apparatus 200. In an example, the communicator 210 includes an internal bus and an external bus. In another example, the communicator 210 is an element configured to connect the virtual object generation apparatus 200 to an external device. The communicator 210 is, for example, an interface. The communicator 210 receives data from the external device and transmits data to the processor 220 and the memory 230.

The processor 220 processes data received by the communicator 210 and data stored in the memory 230. The term "processor," as used herein, may be a hardware-implemented data processing device having a circuit that is physically structured to execute desired operations. In an example, the desired operations include code or instructions included in a program. The hardware-implemented data processing device may include, but is not limited to, for example, a microprocessor, a central processing unit (CPU), a processor core, a multi-core processor, a multiprocessor, an application-specific integrated circuit (ASIC), and a field-programmable gate array (FPGA).

The processor 220 executes a computer-readable code (stored in a memory (for example, the memory 230).

The memory 230 stores data received by the communicator 210 and data processed by the processor 220. In an example, the memory 230 stores a program. In an example, the stored program is coded to generate a virtual object and is a set of syntax executable by the processor 220.

The memory 230 includes, for example, at least one volatile memory, a nonvolatile memory, a random access memory (RAM), a flash memory, a hard disk drive and an optical disc drive. The memory 230 stores an instruction set (for example, software) to operate the virtual object generation apparatus 200. The instruction set to operate the virtual object generation apparatus 200 is executed by the processor 220.

The communicator 210, the processor 220 and the memory 230 is further described below, in particular with reference to FIGS. 3 through 12.

Figure 3:
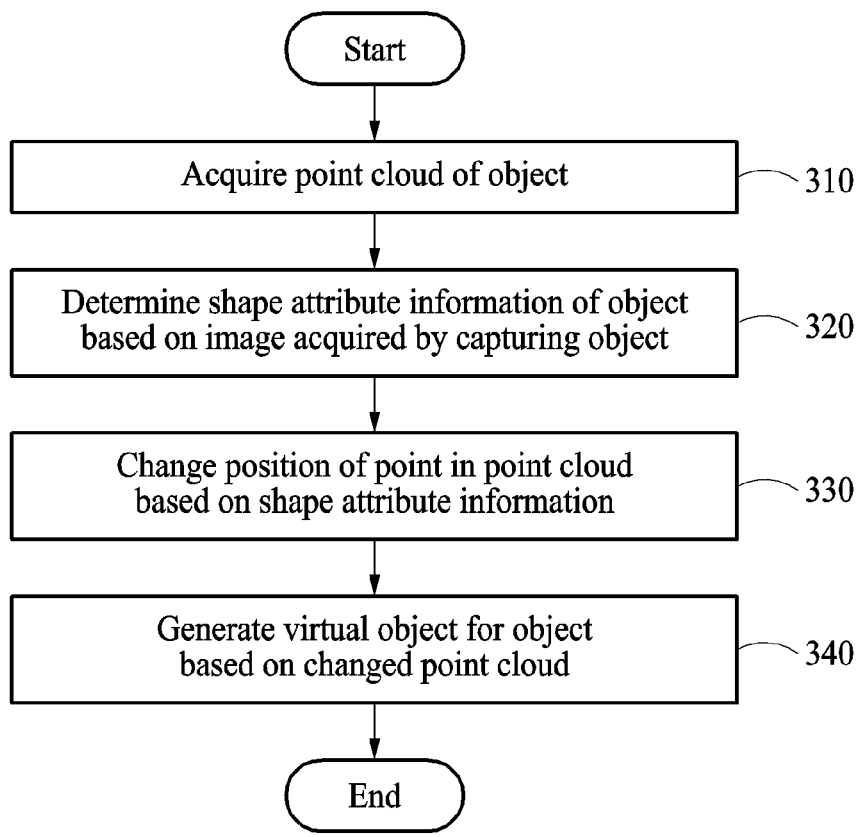
FIG. 3 is a diagram illustrating a virtual object generation method.

FIG. 3 is a diagram illustrating a virtual object generation method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Operations 310 through 340 of FIG. 3 are performed by, for example, the virtual object generation apparatus 200 of FIG. 2.

In operation 310, the processor 220 acquires a point cloud of an object. The point cloud is a set of points representing an appearance of a real object (hereinafter, referred to as an "object") in a virtual 3D space. The points have coordinates in the 3D space.

In an example, the point cloud is generated based on a depth map of the object. Examples of generating a point cloud will be further described below with reference to FIGS. 4 and 5.

In operation 320, the processor 220 determines shape attribute information of the object based on an image acquired by capturing the object. In an example, the shape attribute information is expressed by a vector representing a plurality of shapes. For example, the plurality of shapes include shapes such as, for example, a mirror symmetry, a rotational symmetry, a thin structure, a rough surface and a smooth surface. An example of a vector for shape attribute information will be further described below with reference to FIG. 6.

In an example, the processor 220 determines the shape attribute information using a neural network that is trained to recognize a shape of the object. For example, an image of the object is input to the neural network, and shape attribute information corresponding to the input image is output. The neural network is trained in advance based on a label indicating a shape of the object and an image acquired by capturing the object. For example, the label indicates a shape of the object among the plurality of shapes. When shape attribute information of the object is not accurately determined using the trained neural network, the neural network is additionally trained. At least one parameter value of the neural network is changed so that the neural network determines a correct answer. For example, the neural network is trained using a backpropagation. In an example, the neural network is implemented as an algorithm and is performed by, for example, the processor 220.

In operation 330, the processor 220 changes a position of at least one point in the point cloud based on the determined shape attribute information.

In an example, an energy field of the point cloud is calculated based on the determined shape attribute information, and a position of at least one point in the point cloud is changed based on the energy field. An example of changing a position of a point in the point cloud based on an energy field will be further described below with reference to FIG. 7.

In another example, a position of at least one point in the point cloud is repeatedly changed based on elements of a vector representing a plurality of shapes which will be described below. An example of repeatedly changing a position of at least one point in the point cloud based on elements of a vector will be further described below with reference to FIG. 11.

Examples of a point cloud in which a position of at least one point is changed will be further described below with reference to FIGS. 9 and 10. In the following description, a point cloud in which a position of a point is changed is referred to as a "changed point cloud."

In operation 340, the processor 220 generates a virtual object for the object based on the changed point cloud. The generated virtual object is, for example, a 3D model of the object. In an example, the virtual object does not include a texture. In another example, when a point cloud is generated based on a color image, the virtual object includes a texture. The generated virtual object is included in AR content or VR content. An example of generating a virtual object will be further described below with reference to FIG. 12.

FIG. 4 is a diagram illustrating an example of acquiring a point cloud in operation 310 of FIG. 3. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIGS. 3 and 4, operation 310 includes operations 410 and 420.

In operation 410, the processor 220 generates a depth map based on images acquired by capturing the object. For example, the virtual object generation apparatus 200 further includes a camera (not shown). In an example, a user of the virtual object generation apparatus 200 acquires color images of an object using the camera. In an example, the color images are images acquired by capturing the object from different viewpoints.

In an example, the processor 220 calculates a binocular disparity based on color images acquired from different viewpoints. The depth map is generated based on the binocular disparity. Based on a variety of capturing viewpoints of color images, depth maps of various viewpoints are generated.

For example, when a depth map is generated based on a color image, a point of the depth map includes a color value or texture information of a pixel of the depth map. The color value or the texture information of the pixel of the depth map is acquired from a pixel of the color image corresponding to the pixel.

In operation 420, the processor 220 generates a point cloud based on the depth map. As depth maps vary in viewpoint, an occlusion region of the point cloud is reduced. For example, the processor 220 detects feature points from a plurality of depth maps, and connects or combines a feature point of a first depth map and a feature point of a second depth map that corresponds to the feature point, to generate a point cloud.

FIG. 5 is a diagram illustrating another example of acquiring a point cloud in operation 310 of FIG. 3. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIGS. 3 and 5, operation 310 includes operations 510 and 520. The virtual object generation apparatus 200 further includes a depth camera (not shown).

In operation 510, a depth map of an object is generated using the depth camera. In an example, the depth camera generates a depth map using a laser. In another example, the depth camera generates a depth map based on a calculated time of flight (ToF) by emitting and receiving light. A scheme of generating a depth map using the depth camera is not limited to the examples, and other schemes of generating a depth map are considered to be well within the scope of the present disclosure. A plurality of depth maps with different viewpoints are generated using the depth camera.

In operation 520, the processor 220 generates a point cloud based on the depth map. The above description of operation 420 of FIG. 4 is also applicable to operation 520, and accordingly is not repeated herein for clarity and conciseness.

Figures 6, 7:
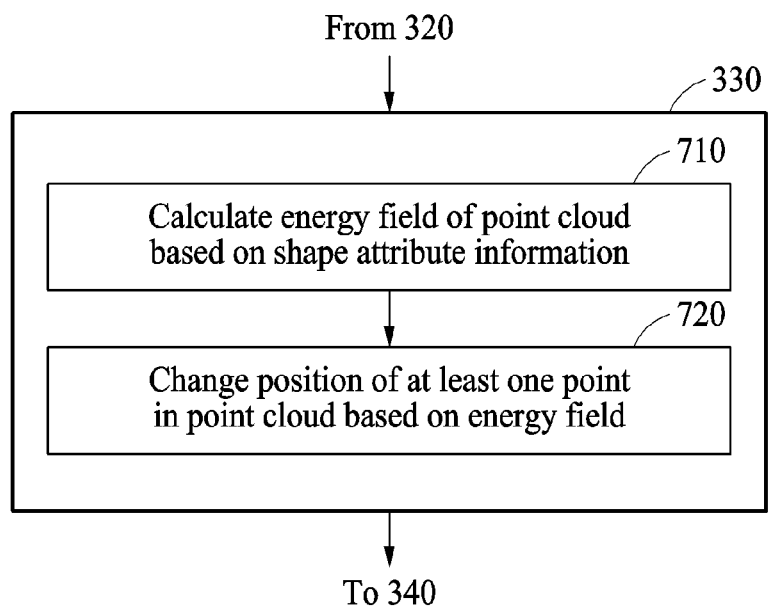
FIG. 6 illustrates an example of shape attribute information.
FIG. 7 is a diagram illustrating an example of changing a position of a point in a point cloud based on an energy field.

FIG. 6 illustrates an example of shape attribute information 600.

The shape attribute information 600 includes a plurality of shapes 610 and vectors 620 of the shapes 610. In an example, the plurality of shapes 610 include shapes such as, a mirror symmetry (attribute_A), a rotational symmetry (attribute_B), a thin structure (attribute_C), a rough surface (attribute_D), and the like.

A neural network determines which one of the shapes 610 corresponds to an object based on an input image of the object. For example, the neural network determines a shape of the object to correspond to a mirror symmetry and a thin structure. Each of elements of a vector is, for example, a binary value. For example, the neural network determines the vectors 620 of the object as [1 0 1 0 . . . ]. When an element of a vector has a value of "1," the object is determined to have a shape corresponding to the element. When an element of a vector has a value of "0," the object is determined not to have a shape corresponding to the element.

FIG. 7 is a diagram illustrating an example of changing a position of a point in a point cloud based on an energy field in operation 330 of FIG. 3. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIGS. 3 and 7, operation 330 includes operations 710 and 720.

In operation 710, the processor 220 calculates an energy field of the point cloud based on the determined shape attribute information. The energy field is, for example, a constraint of a position or a distribution of points in the point cloud. The energy field includes a curved surface and a plane that are set in a 3D space in which the point cloud is located, or a combination of the plane and the curved surface.

For example, when an object is determined to have a smooth surface, an energy field is determined so that a surface of the point cloud is flat. An energy field to smooth the surface of the point cloud is, for example, a Laplacian field. An example of calculating an energy field will be further described below with reference to FIG. 8.

In operation 720, the processor 220 changes a position of at least one point in the point cloud based on the calculated energy field.

In an example, when the energy field is calculated so that the surface of the point cloud is flat, positions or a distribution of points in the point cloud are changed to smooth the surface of the point cloud. In this example, based on the calculated energy field, a point protruding from the surface of the point cloud moves inwards, and a recessed point in the point cloud moves outwards. When the point cloud has an occlusion region, points move to complement for the occlusion region.

In another example, the processor 220 detects, as a noise point, a point that does not correspond to the calculated energy field from the point cloud, and deletes the detected point from the point cloud.

Figure 8:
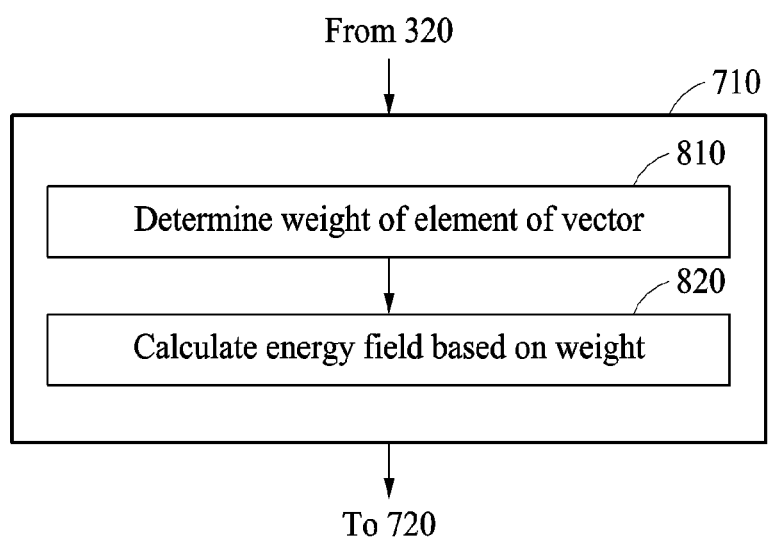
FIG. 8 is a diagram illustrating an example of calculating an energy field.

FIG. 8 is a diagram illustrating an example of calculating an energy field in operation 710 of FIG. 7. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIGS. 7 and 8, operation 710 includes operations 810 and 820.

In operation 810, the processor 220 determines a weight of each of elements of a vector. For example, a weight of a shape representing "1" as an element is determined. Referring to FIG. 6, a weight of each of the mirror symmetry (attribute_A) and the thin structure (attribute_C) is determined.

In operation 820, the processor 220 calculates the energy field based on the weight. For example, when a unique energy field of each shape is set in advance, an energy field of an object calculated based on weights is expressed as a weighted sum of energy fields. An energy field of the mirror symmetry (attribute_A) is denoted by $E_A$, and a weight is denoted by $W_A$. An energy field of the thin structure (attribute_C) is denoted by $E_C$, and a weight is denoted by $W_C$. A final energy field $E_T$ of the object is calculated using Equation 1 shown below.

$$E_T = (W_A) \times (E_A) + (W_C) \times (E_C) \quad \text{[Equation 1]}$$

The processor 220 changes a distribution of points in the point cloud based on the final energy field $E_T$.

Figure 9:
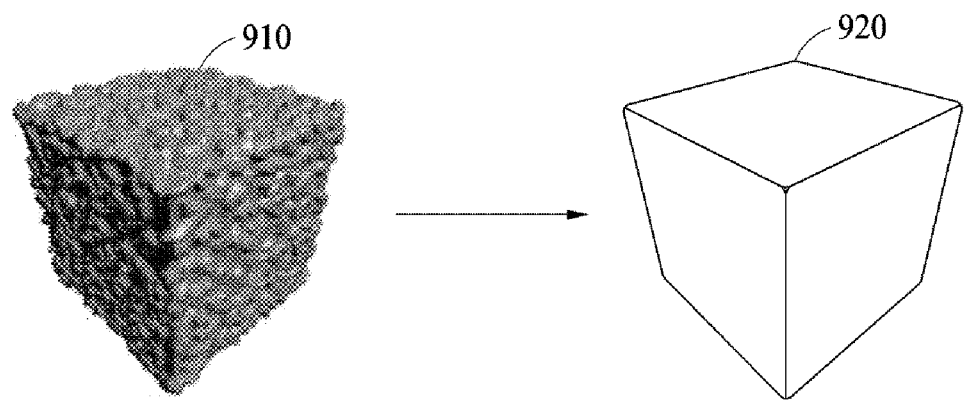
FIG. 9 illustrates an example of a changed point cloud.

FIG. 9 illustrates an example of a changed point cloud.

A point cloud 910 generated based on a depth image does not clearly reflect a shape of a real object. An object has a shape of a cube with a smooth surface, however, the generated point cloud 910 does not have a smooth surface.

A neural network determines shape attribute information of the object in response to an input of an image representing the object. For example, the determined shape attribute includes a cube and a smooth surface. A final energy field is calculated based on an energy field of each of the cube and the smooth surface.

The processor 220 generates a changed point cloud 920 by changing a position of at least one point in the point cloud 910 based on the final energy field. For example, a noise point that deviates from the shape of the cube is deleted from among points in the point cloud 910 based on the final energy field, and positions and a distribution of points in the point cloud 910 are changed so that a shape of the point cloud 920 represents the cube and the smooth surface.

Figure 10:
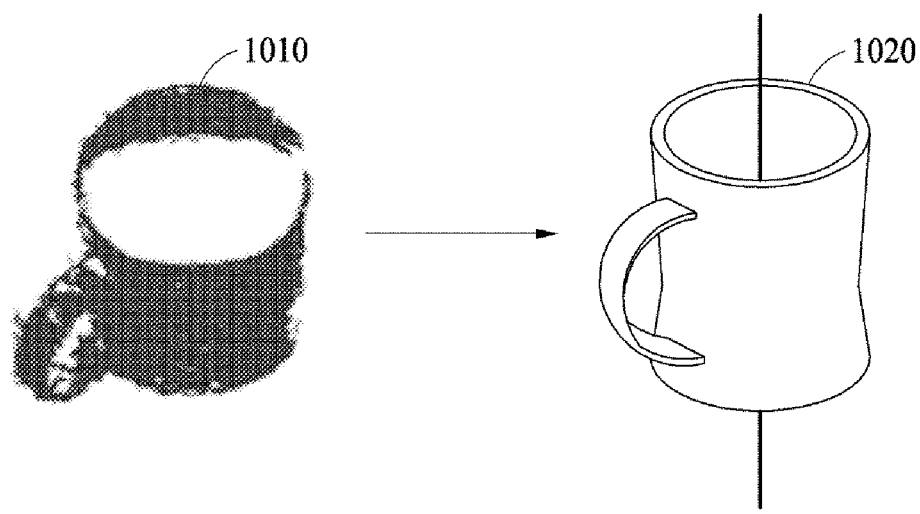
FIG. 10 illustrates another example of a changed point cloud.

FIG. 10 illustrates another example of a changed point cloud.

A point cloud 1010 generated based on a depth image does not clearly reflect a shape of a real object. A body portion of an object has a cylindrical symmetry except for a handle portion, however, the generated point cloud 1010 does not have a cylindrical symmetry.

A neural network determines shape attribute information of the object in response to an input of an image representing the object. For example, the determined shape attribute includes a cylindrical symmetry. A final energy field is calculated based on an energy field for the cylindrical symmetry.

The processor 220 generates a changed point cloud 1020 by changing a position of at least one point in the point cloud 1010 based on the final energy field. For example, a noise point that deviates from a shape of the cylindrical symmetry is deleted from among points in the point cloud 1010 based on the final energy field, and positions and a distribution of the points in the point cloud 1010 are changed so that the point cloud 1020 represents the cylindrical symmetry.

Figure 11:
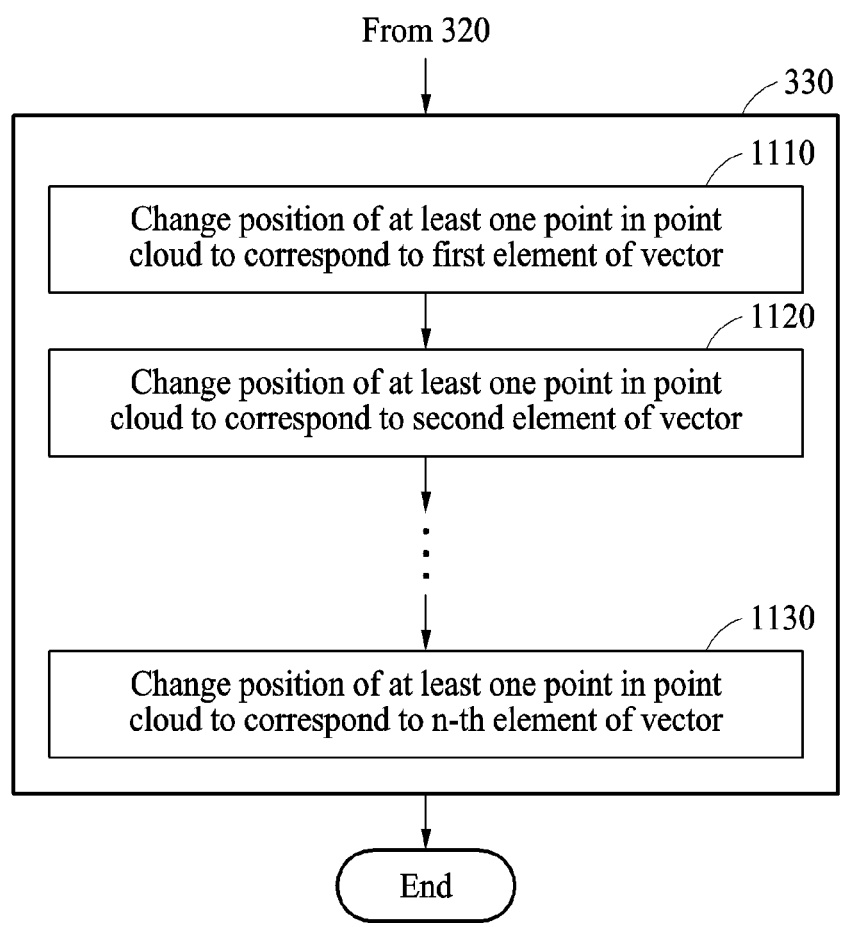
FIG. 11 is a diagram illustrating an example of repeatedly changing a position of a point in a point cloud.

FIG. 11 is a diagram illustrating an example of repeatedly changing a position of a point in a point cloud in operation 330 of FIG. 3. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Referring to FIGS. 3 and 11, operation 330 includes operations 1110, 1120 and 1130. Points in the point cloud are rearranged for each of determined shapes of the object. For example, when "n" shapes of the object are determined, the points are rearranged "n" times.

In operation 1110, the processor 220 changes a position of at least one point in the point cloud to correspond to a first element of a vector. For example, the first element represents the above-described mirror symmetry, and positions of points in the point cloud are changed to represent the mirror symmetry.

In operation 1120, the processor 220 changes a position of at least one point in the point cloud to correspond to a second element of the vector. For example, the second element represents the above-described rotational symmetry, and positions of points in the point cloud are changed to represent the rotational symmetry.

In operation 1130, the processor 220 the processor 220 changes a position of at least one point in the point cloud to correspond to an n-th element of the vector.

Figure 12:
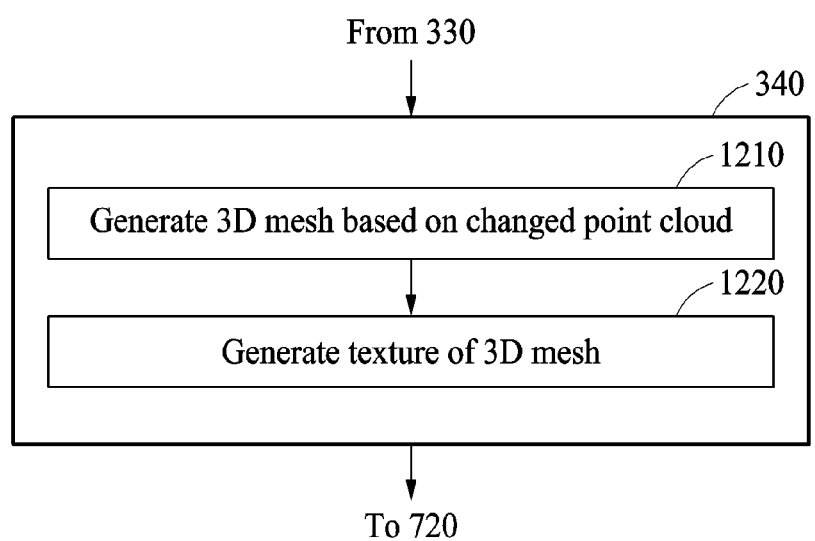
FIG. 12 is a diagram illustrating an example of generating a virtual object based on a three-dimensional (3D) mesh.

FIG. 12 is a diagram illustrating an example of generating a virtual object based on a 3D mesh in operation 340 of FIG. 3. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

Referring to FIGS. 3 and 12, operation 340 includes operations 1210 and 1220.

In operation 1210, the processor 220 generates a 3D mesh based on the changed point cloud. For example, a plurality of vertices are generated based on the point cloud. The 3D mesh is generated based on the plurality of vertices. A line connecting two vertices is an edge, and a face is generated by neighboring edges. The 3D mesh is, for example, a polygon mesh. The 3D mesh is also referred to as a "virtual object."

Operation 1220 is selectively performed when information of a color value is included in vertices of the 3D mesh. For example, when a point cloud is generated based on a color image of an object, operation 1220 is performed.

In operation 1220, the processor 220 generates a texture of the 3D mesh. For example, when a point cloud is generated based on a color image, points of the point cloud include texture information of pixels of the color image corresponding to the points. Vertices of the 3D mesh are generated based on the points of the point cloud, and accordingly vertices corresponding to the points have the texture information.

When the texture of the 3D mesh is generated, both a color and a shape of the virtual object are expressed similarly to a real object.

The virtual object generation apparatus 200, other apparatuses, devices, and other components described herein with respect to FIG. 2 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4, 5, 7, 8, 11 and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a virtual object, the method comprising:
   acquiring a point cloud that is generated based on a depth map of an object;
   determining shape attribute information of the object based on an image of the object using a neural network trained to recognize a shape of the object by generating the shape attribute information as respective information with respect to a plurality of shape attributes comprising at least two of a mirror symmetry, a rotational symmetry, a thin structure, a rough surface, or a smooth surface, wherein an element, corresponding to a vector having the respective information as respective elements of the vector, is a binary value;
   changing a position of at least one point in the point cloud, based on the shape attribute information, comprising:
      changing a position of a first point in the point cloud, to correspond to a first element of the vector; and
      changing a position of a second point in the point cloud, to correspond to a second element of the vector; and
   generating a virtual object for the object based on the point cloud in which the position of the at least one point is changed.

2. The method of claim 1, wherein the acquiring of the point cloud comprises:
   generating a depth map based on the image; and
   generating the point cloud based on the depth map.

3. The method of claim 2, wherein the generating of the depth map comprises generating depth maps for multiple viewpoints of the object.

4. The method of claim 1, wherein the acquiring of the point cloud comprises:
   generating the depth map of the object using a depth camera; and
   generating the point cloud based on the generated depth map.

5. The method of claim 1, wherein the generating of the virtual object comprises:
   generating a three-dimensional (3D) mesh based on the point cloud in which the position of the at least one point is changed; and
   generating a texture of the 3D mesh.

6. The method of claim 5, wherein the generating of the texture of the 3D mesh comprises generating the texture of the 3D mesh, in response to the image being a color image.

7. The method of claim 1, wherein the virtual object is included in any one or any combination of augmented reality (AR) content or virtual reality (VR) content.

8. The method of claim 1, wherein a number of times the position of the at least one point in the point cloud is changed corresponds to a number of elements of a vector having the respective information as respective elements of the vector.

9. The method of claim 1, wherein the determining of the shape attribute information includes applying image information of the image to a machine learning trained multi-attribute classification model that outputs respective information that indicate which of plural attributes in the image are resultatively classified as being attributes of the object.

10. A non-transitory computer-readable storage medium storing instructions that, when executed by a processor, cause the processor to perform the method of claim 1.

11. An apparatus for generating a virtual object, the apparatus comprising:
   a processor; and
   a memory storing instructions that when executed by the processor configure the processor to:
      acquire a point cloud that is generated based on a depth map of an object;
      determine shape attribute information of the object based on an image of the object using a neural network trained to recognize a shape of the object by generating the shape attribute information as respective information with respect to a plurality of shape attributes comprising at least two of a mirror symmetry, a rotational symmetry, a thin structure, a rough surface, or a smooth surface;
      change a position of at least one point in the point cloud based on the shape attribute information;
      change a position of a first point of the at least one point in the point cloud, to correspond to a first element of the vector;
      change a position of a second point of the at least one point in the point cloud, to correspond to a second element of the vector; and
      generate a virtual object for the object based on the point cloud in which the position of the at least one point is changed.

12. The apparatus of claim 11, wherein the processor is further configured to:
   generate a depth map based on the image; and
   acquire the point cloud based on the generated depth map.

13. The apparatus of claim 11, further comprising a memory configured to store any one or any combination of the depth map of the object, the image of the object, and the virtual object.

14. The apparatus of claim 11, wherein the neural network is a trained multi-attribute classification model that outputs a vector, where respective elements of the vector correspond to the respective information to indicate which of the plural attributes in the image are resultatively classified as being attributes of the object.

* * * * *